(12) United States Patent
Eckert et al.

(10) Patent No.: US 12,367,760 B2
(45) Date of Patent: Jul. 22, 2025

(54) METHOD FOR COMMUNICATING BETWEEN A MOTOR VEHICLE AND AN INFRASTRUCTURE

(71) Applicant: Robert Bosch GmbH, Stuttgart (DE)

(72) Inventors: Kurt Eckert, Ditzingen (DE); Frank Hofmann, Hildesheim (DE); Tobias Frye, Braunschweig (DE)

(73) Assignee: ROBERT BOSCH GMBH, Stuttgart (DE)

(*) Notice: Subject to any disclaimer, the term of this patent is extended or adjusted under 35 U.S.C. 154(b) by 216 days.

(21) Appl. No.: 18/058,590

(22) Filed: Nov. 23, 2022

(65) Prior Publication Data
US 2023/0169851 A1 Jun. 1, 2023

(30) Foreign Application Priority Data
Nov. 29, 2021 (DE) ..................... 10 2021 213 403.3

(51) Int. Cl.
*G08G 1/01* (2006.01)
*H04W 76/10* (2018.01)

(52) U.S. Cl.
CPC .......... *G08G 1/0116* (2013.01); *H04W 76/10* (2018.02)

(58) Field of Classification Search
CPC .............................. G08G 1/0116; H04W 76/10
See application file for complete search history.

(56) References Cited

U.S. PATENT DOCUMENTS

2019/0349957 A1* 11/2019 Sorrentino .............. H04L 67/51
2020/0366537 A1* 11/2020 Wang ................... H04B 7/0626
2021/0086766 A1* 3/2021 Nordbruch ............ B60W 30/09

FOREIGN PATENT DOCUMENTS

EP            3313136 B1     4/2018
WO      2017051330 A1     3/2017
WO      2020221554 A1    11/2020

\* cited by examiner

*Primary Examiner* — Andrew J Cromer
(74) *Attorney, Agent, or Firm* — NORTON ROSE FULBRIGHT US LLP (57) ABSTRACT

A method for communicating between a motor vehicle and an infrastructure. The method includes: ascertaining a requirement vector for at least one function to be carried out with the aid of the motor vehicle and/or the infrastructure, the requirement vector indicating which characteristics of a communication link between the motor vehicle and the infrastructure should simultaneously be satisfied for an execution of the function; ascertaining a communication state, which indicates which communication possibilities exist for a communication link between the motor vehicle and the infrastructure; ascertaining a radio channel between the motor vehicle and the infrastructure based on the requirement vector and based on the ascertained communication state; establishing a communication link between the motor vehicle and the infrastructure using the ascertained radio channel to carry out the at least one function using the established communication link.

15 Claims, 3 Drawing Sheets

METHOD FOR COMMUNICATING BETWEEN A MOTOR VEHICLE AND AN INFRASTRUCTURE

FIELD

The present invention relates to a method for communicating between a motor vehicle and an infrastructure, to a device, a computer program and a machine-readable memory medium.

BACKGROUND INFORMATION

As also in other technology fields, networking plays an ever-greater role in motor vehicle applications. A steadily increasing number of motor vehicles has the capability of connecting to other road users, infrastructure components (roadside units) or to backend services in the cloud. Different variants of communication channels typically exist, from which, in most cases, a matching technology as well as corresponding performance features are already specified during the design stage of the corresponding system. In some instances, an adaptation of the channels to changing requirements takes place (rate adaptation, adaptation of the modulation type in WLAN according to the quality of the radio link). In functions that place high demands on the latency, availability and functional safety (higher ASIL level (Automotive Safety Integrity Level)), it is currently difficult to appropriately specify function channels because the demands partially affect each other or sometimes even hamper each other. In addition, the demands may change dynamically (e.g., the required latency may greatly depend on the speed at which the motor vehicle is traveling just then).

PCT Patent Application No. WO 2017/051330 A1 describes a transmission of data packets.

U.S. Patent Application Publication No. US 2019/0349957 A1 describes a mechanism for sharing channels in a wireless communications system.

European Patent No. EP 3 313 136 B1 describes a method for transmitting information.

SUMMARY

The task on which the present invention is based is to provide a concept for an efficient communication between a motor vehicle and an infrastructure.

This object may be achieved by the present invention. Advantageous refinements and embodiments of the present invention are disclosed herein.

According to a first aspect of the present invention, a method for communicating between a motor vehicle and an infrastructure is provided. According to an example embodiment of the present invention, the method include the following steps:

Ascertaining at least one requirement vector for at least one function to be carried out with the aid of the motor vehicle and/or the infrastructure, the at least one requirement vector indicating which characteristics of a communication link between the motor vehicle and the infrastructure should simultaneously be satisfied for an execution of the function, Ascertaining a communication state, in particular one or more communication state(s), which indicate(s) which communication possibilities exist for a communication link between the motor vehicle and the infrastructure, Ascertaining at least one radio channel between the motor vehicle and the infrastructure based on the at least one requirement vector and based on the ascertained communication state, Establishing at least one communication link between the motor vehicle and the infrastructure using the at least one ascertained radio channel in order to carry out the at least one function using the at least one established communication link.

According to a second aspect of the present invention, a device is provided, which is developed to carry out all steps of the method according to the first aspect.

According to a third aspect of the present invention, a computer program is provided, which includes instructions that when executed by a computer, e.g., the device according to the second aspect of the present invention, induce the computer to carry out a method according to the first aspect.

According to a fourth aspect of the present invention, a machine-readable memory medium is provided on which the computer program according to the third aspect is stored.

The present invention is based on and encompasses the understanding that the above objective is able to be achieved by ascertaining a requirement vector for a predefined situation in which the motor vehicle finds itself at that moment and which indicates characteristics that should, in particular must, be simultaneously satisfied in order to carry out a function using a communication link between the motor vehicle and the infrastructure. In other words, the corresponding requirement vector is ascertained for the function to be realized or carried out. To this end, for example, all relevant individual requirements, i.e., the characteristics such as latency, data rate, demand on the functional safety, data security requirements and their validity range, e.g., a minimum value, maximum value, standard deviation, compliance probability, may be specified.

According to an example embodiment of the present invention, it is furthermore provided that a communication state is ascertained, which indicates which communication possibilities exist for a communication link between the motor vehicle and the infrastructure. For example, this means that all possible developments of the communication channels (radio channel) and their variants are ascertained. That means, for instance, that it is ascertained which basic communication possibilities such as a mobile communication, WLAN, exist between the infrastructure and the motor vehicle, in particular which variants of these communication possibilities exist such as different frequency ranges, different modulation types.

Next, a radio channel is ascertained and established between the motor vehicle and the infrastructure based on the ascertained requirement vector and the ascertained communication state. For example, the ascertaining of the radio channel includes selecting a radio channel from a multitude of possible radio channels that were ascertained within the scope of ascertaining the communication state.

In other words, this particularly means that at the runtime of the function, i.e., when the function is executed, for instance, the most suitable communications method is allocated to the respective current requirement vector just then and selected as the communication channel (radio channel).

According to the present invention disclosed herein, a communication link is therefore established between the motor vehicle and the infrastructure using the ascertained radio channel in order to carry out the at least one function with the aid of the established communication link.

For example, depending on the respective requirements for the execution of the function, this provides the technical advantage that the optimal communication possibility is used for communicating between the motor vehicle and the infrastructure.

For instance, this provides the technical advantage that an efficient communication between the motor vehicle and the infrastructure is possible.

In one embodiment of the present invention, it is provided that the present method encompasses the step of carrying out the at least one function using the at least one established communication link.

In one embodiment of the present invention, it is provided that the method according to the first aspect is a computer-implemented method.

For example, this provides the technical advantage that the method is implementable in an efficient manner.

The embodiments and exemplary embodiments described here are able to be combined in any desired form even if this is not explicitly described.

Technical functionalities of the method according to the first aspect analogously result from corresponding technical functionalities of the device according to the second aspect, and vice versa. This means that device features result from corresponding method features, and vice versa.

The abbreviation "at least one" means 'one or more'. When technical features such as 'communication link', 'requirement vector', and 'function' are expressed in the singular, the plural is always meant to be included as well, and vice versa. The wording 'at least some' means 'a few or all'.

In one example embodiment of the present invention, multiple communication links are established, which are kept open, in particular, and based on the requirement vector, one or more of the established communication links is/are selected to transmit data between the infrastructure and the motor vehicle via the one or more selected communication links.

In one example embodiment of the present invention, it is provided that multiple requirement vectors are ascertained for multiple functions in each case, the multiple functions being prioritized, and a first radio channel is ascertained for the particular function having a highest priority in order to establish a first communication link between the motor vehicle and the infrastructure, and it is checked whether the first radio channel may also be used for at least some of the remaining further functions, without at least some of the particular characteristics of the requirement vector corresponding to the particular function having the highest priority, which are satisfied in the first communication link, then no longer being satisfied, and if not, the first radio channel is used for the at least some of the remaining further functions in order to carry out the corresponding functions using the first communication link; and if not, at least one second radio channel is ascertained based on the respective requirement vector of the at least some of the remaining further functions, and at least one second communication link is established between the motor vehicle and the infrastructure based on the at least one second radio channel in order to carry out the at least some of the remaining further functions using the at least one second established communication link.

For example, this achieves the technical advantage that the first radio channel can be used in an efficient manner in a case where the first radio channel is able to be used for the at least some of the remaining further functions. If this is not possible, the fact that in this case at least one second radio channel is ascertained for the remaining functions efficiently ensures that the first function is able to be carried out in an efficient manner using the first communication link.

The wording "at least one second" in particular includes a second, a third, and an . . . nth, n being a natural number greater than 2.

According to one example embodiment of the present invention, it is provided that the characteristics of the at least one requirement vector are weighted, and the at least one radio channel is ascertained based on the weighted characteristics.

For instance, this achieves the technical advantage that the radio channel can be ascertained in an efficient manner. The weighting advantageously makes it possible to characterize as particularly relevant certain characteristics that must be taken into consideration to a considerable extent when ascertaining the requirement vector.

In one embodiment of the present invention, it is provided that the at least one radio channel is ascertained based on a table, which indicates a fixed assignment between communication possibilities and requirement vectors.

For example, this provides the technical advantage that the radio channel is ascertainable in an efficient manner.

The table is a lookup table, for instance. The table, for example, is stored in a memory. The ascertaining of the at least one radio channel based on the table includes reading out the table from the memory, for example.

In one embodiment of the present invention, it is provided that in order to ascertain the at least one radio channel, the ascertained at least one requirement vector and the ascertained communication state are transmitted to an input layer of an artificial neural network, the artificial neural network ascertaining a communication channel based on the at least one requirement vector and based on the ascertained communication state, and outputting it at an output layer of the artificial neural network.

For example, this provides the technical advantage that the radio channel is ascertainable in an efficient manner.

According to this example embodiment of the present invention, the use of an artificial neural network is provided for ascertaining the at least one radio channel. The ascertaining of the at least one radio channel is therefore assumed by the artificial neural network.

Within the framework of training, the artificial neural network is trained by the training data in a convention manner, these training data including communication states, requirement vectors and, as a result, radio channels.

In one example embodiment of the present invention, it is provided that the ascertaining of at least one radio channel includes an ascertainment of a transport protocol, in particular a TCP, RTP, UDP, for transporting data to be communicated via the at least one communication link.

For instance, this provides the technical advantage that the data to be communicated are able to be transported in an efficient manner via the at least one communication link.

The abbreviation "TCP" stands for Transmission Control Protocol. The abbreviation "UDP" stands for User Datagram Protocol. The abbreviation "RTP" stands for Real Time Transport Protocol.

It should be noted that the TCP, RTP and UDP are only a few representative examples of transport protocols. In general, for instance, it is possible, to use a transport protocol that features a guaranteed delivery or non-guaranteed delivery for transporting data to be communicated via the at least one communication link.

In one example embodiment of the present invention, it is provided to use two parallel transport protocols for transporting data to be communicated via the at least one communication link, a first transport protocol for transmitting the data and a second transport protocol for controlling the transmission (e.g., with regard to functional security) of the data.

In one example embodiment of the present invention, it is provided that the at least one function is an individual element selected from the following group of functions: transmitting environment data that describe an environment of the motor vehicle from the motor vehicle to the infrastructure and/or vice versa; transmitting at least one control instruction for the at least partially automated control of a lateral and/or longitudinal guidance of the motor vehicle from the infrastructure to the motor vehicle; transmitting data purely for information purposes from the motor vehicle to the infrastructure and vice versa; transmitting data that are required for a safety-critical function from the motor vehicle to the infrastructure and/or vice versa.

For instance, this offers the technical advantage that functions that are relevant in an at least partially automated driving operation the motor vehicle are able to be carried out in an efficient manner.

An at least partially automated control of a lateral and/or longitudinal guidance of the motor vehicle thus induces an at least partially automated guidance of the motor vehicle.

The wording "at least partially automated control" includes one or more of the following cases: an assisted control, a partially automated control, a highly automated control, and a fully automated control. The wording "at least partially automated" thus encompasses one or more of the following wordings:

assisted, partially automated, highly automated, and fully automated.

An assisted control means that a driver of the motor vehicle permanently carries out either the lateral or the longitudinal control of the motor vehicle. The respective other driving task (that is, a control of the longitudinal or lateral guidance of the motor vehicle) is carried out in an automatic manner. In other words, in an assisted control of the motor vehicle, either the lateral or the longitudinal guidance is controlled automatically.

A partially automated control means that in a specific situation (for instance traveling on a superhighway, driving within a parking facility, overtaking an object, driving within a traffic lane specified by lane markings), and/or for a certain period of time, a longitudinal and a lateral guidance of the motor vehicle are controlled automatically. A driver of the motor vehicle does not have to manually control the longitudinal and lateral guidance of the motor vehicle on his own. However, the driver must permanently monitor the automatic control of the longitudinal and lateral guidance in order to be ready to manually intervene should this become necessary. The driver must be ready at all times to take full control of the motor vehicle guidance.

A highly automated control means that, for a certain period of time in a specific situation (e.g., traveling on a superhighway, driving within a parking facility, overtaking an object, driving within a traffic lane specified by lane markings), a longitudinal and a lateral guidance of the motor vehicle are controlled automatically. There is no need for a driver of the motor vehicle to manually control the longitudinal and lateral guidance of the motor vehicle on his own. The driver is not required to permanently monitor the automatic control of the longitudinal and lateral guidance in order to be capable of manually intervening, if necessary. Should the need arise, a takeover request to assume control of the longitudinal and lateral guidance will automatically be output to the driver, in particular with a sufficient time reserve. In other words, the driver must potentially be able to take over the control of the longitudinal and lateral guidance. Limits of the automatic control of the lateral and longitudinal guidance are identified automatically. In a highly automated control, it is not possible to automatically bring about a state of minimum risk in every starting situation.

A fully automated control means that in a specific situation (for instance traveling on a superhighway, driving within a parking facility, overtaking an object, traveling within a traffic lane specified by lane markings), a longitudinal and lateral guidance of the motor vehicle are controlled automatically. A driver of the motor vehicle does not have to manually control the longitudinal and lateral guidance of the motor vehicle on his own. The driver is not required to monitor the automatic control of the longitudinal and lateral guidance in order to be able to manually intervene should the need arise. Prior to a conclusion of the automatic control of the lateral and longitudinal guidance, an automatic prompt to the driver to take over the driving task (control of the lateral and longitudinal guidance of the motor vehicle) is implemented, in particular with an adequate time reserve. If the driver does not assume the driving task, an automatic return to a minimum-risk state is brought about. Limits of the automatic control of the lateral and longitudinal guidance are automatically identified. In all situations, it is possible to automatically return to a minimum-risk system state.

According to one example embodiment of the present invention, it is provided that the at least one function encompasses a transmission of environment data describing an environment of the motor vehicle from the motor vehicle to the infrastructure and/or vice versa, the characteristics of the corresponding requirement vector including a minimum data rate, and a maximum latency time; the correspondingly ascertained radio channel being a mobile radio channel or a WLAN radio channel, and the RTP being used as the transport protocol for transmitting the environment data from the motor vehicle to the infrastructure and/or vice versa.

For example, this provides the technical advantage that the environment data are transmittable in an efficient manner. In addition, the technical advantage is obtained that demands made on a teleoperated driving operation of the motor vehicle can be satisfied in an efficient manner.

In one example embodiment of the present invention, it is provided that the at least one function includes a transmission of at least one control instruction for the at least partially automated control of a lateral and/or longitudinal guidance of the vehicle, from the infrastructure to the motor vehicle, the characteristics of the corresponding requirement vector encompassing a maximum latency time and a maximum number of tolerable bit errors, the correspondingly ascertained radio channel being a mobile communication channel or a WLAN radio channel, and, the TCP, for example, being used as the transport protocol for the transmission of the at least one control instruction in order to transmit the at least one control instruction from the infrastructure to the motor vehicle.

For instance, this provides the technical advantage that the at least one control instruction is transmittable in an efficient manner. In addition, this provides the technical advantage that demands made on a teleoperated driving operation of the motor vehicle are able to be satisfied in an efficient manner.

In one example embodiment of the present invention, it is provided that a motor vehicle state is ascertained, which indicates a state in which the motor vehicle currently finds itself, and the at least one requirement vector is ascertained based on the ascertained motor vehicle state.

For example, this provides the technical advantage that the requirement vector is ascertainable in an efficient manner.

In one example embodiment of the present invention, it is provided that the motor vehicle state is described by at least one of the following state parameters: the motor vehicle velocity, motor vehicle position, time of day, date, weather, traffic conditions, especially the traffic density and/or traffic volume.

For instance, this provides the technical advantage that the motor vehicle state is described by particularly suitable state parameters.

In one example embodiment of the present invention, it is provided that the characteristics of the at least one requirement vector is an element selected from the following group of characteristics: a maximum latency time, a maximum number of tolerable bit errors, a minimum data rate, minimum functional safety, minimum availability, and minimum reliability.

For instance, this provides the technical advantage that especially meaningful characteristics are selected.

In one example embodiment of the present invention, it is provided that at least some of the characteristics of the at least one requirement vector may lie within a predefined value window in each case, and the value window is specified especially by a minimum value and/or a maximum value and/or a standard deviation.

For instance, this provides the technical advantage that possible real fluctuations in a latency time, a number of bit errors and a data rate are able to be taken into account in an efficient manner.

In one example embodiment of the present invention, it is provided that the at least one function is part of an at least partially automated driving function.

For example, this provides the technical advantage that the at least partially automated driving function is able to be carried out in an efficient manner.

According to one example embodiment of the present invention, an at least partially automated driving function is an element selected from the following group of at least partially automated driving functions: a traffic jam assistant function, a parking assistant function, a lane keeping assistant function, an overtaking assistant function, a longitudinal guidance function, a lateral guidance function, a longitudinal and lateral guidance function, and teleoperated driving.

For instance, this achieves the technical advantage that especially suitable, at least partially automated driving functions are selectable.

In one example embodiment of the present invention, the present method includes a transmission of data between the motor vehicle and an infrastructure via the communication link.

Exemplary embodiments of the present invention are illustrated in the figures and described in greater detail in the following description.

DETAILED DESCRIPTION OF EXAMPLE EMBODIMENTS

Figure 1:
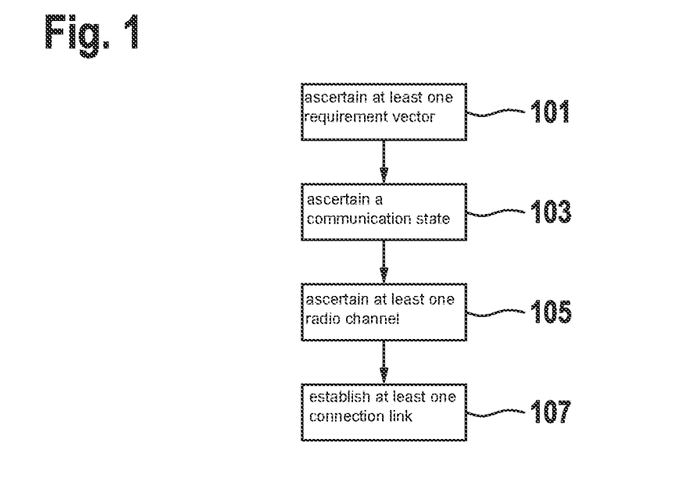
FIG. 1 shows a flow diagram of a method according to the first aspect of the present invention.

FIG. 1 shows a flow diagram of a method for communicating between a motor vehicle and an infrastructure, the method including the following steps:
- Ascertaining 101 at least one requirement vector for at least one function to be carried out with the aid of the motor vehicle and/or the infrastructure, the at least one requirement vector indicating which characteristics of a communication link between the motor vehicle and the infrastructure should simultaneously be satisfied for an execution of the function,
- Ascertaining 103 a communication state, which indicates which communication possibilities exist for a communication link between the motor vehicle and the infrastructure,
- Ascertaining 105 at least one radio channel between the motor vehicle and the infrastructure based on the at least one requirement vector and based on the ascertained communication state,
- Establishing 107 at least one communication link between the motor vehicle and the infrastructure using the at least one ascertained radio channel in order to carry out the at least one function using the at least one established communication link.

In one embodiment, it is provided that the at least one function is carried out using the at least one established communication link.

Figure 2:
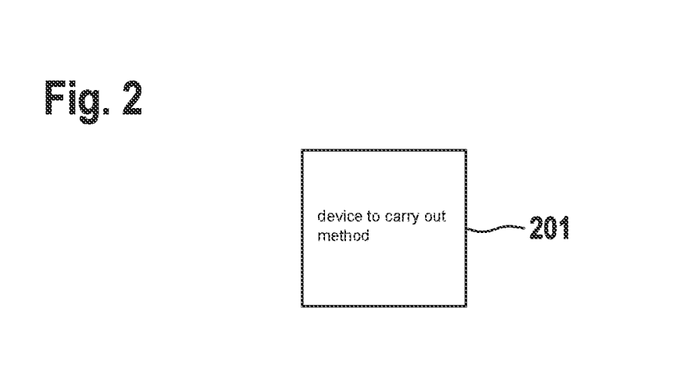
FIG. 2 shows a device according to the second aspect of the present invention.

FIG. 2 shows a device 201 which is developed to carry out all steps of the method according to the first aspect.

Figure 3:
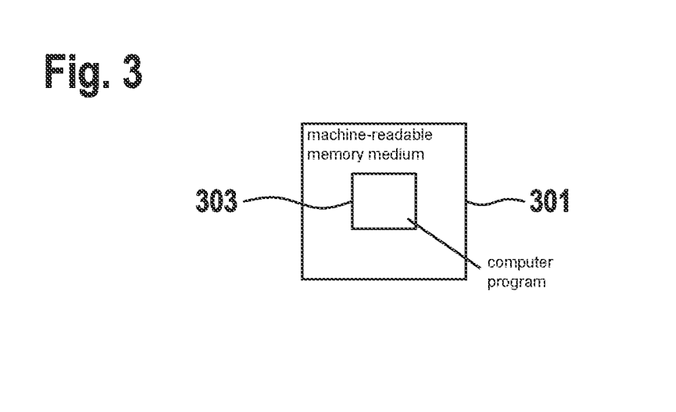
FIG. 3 shows a machine-readable memory medium according to the fourth aspect of the present invention.

FIG. 3 shows a machine-readable memory medium 301 on which a computer program 303 is stored. Computer program 303 includes instructions that when computer program 303 is executed on a computer, induce the computer to carry out a method according to the first aspect.

Figure 4:
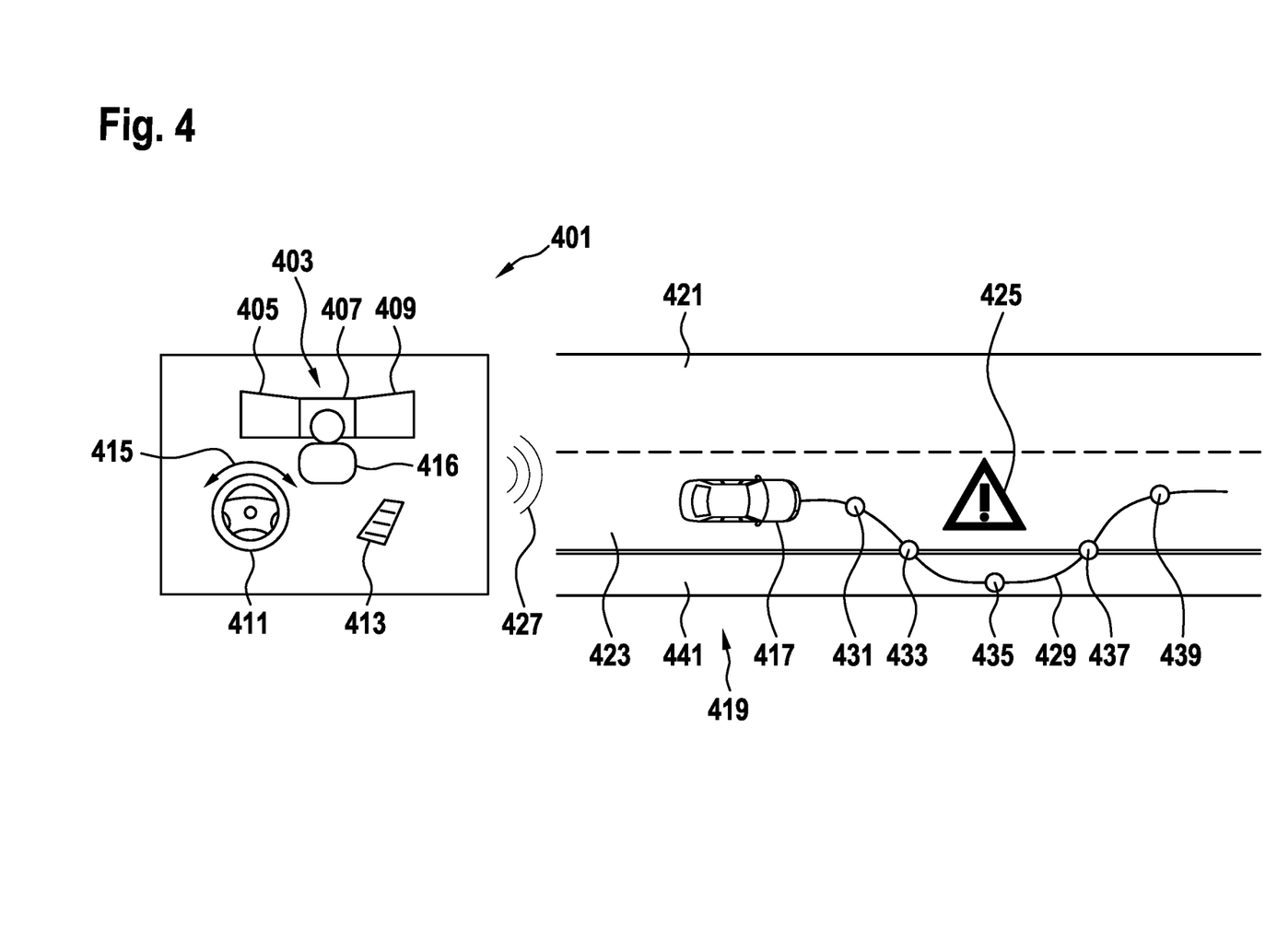
FIG. 4 shows a teleoperated driving operation of a motor vehicle.

FIG. 4 shows teleoperated driving operation of a motor vehicle.

According to FIG. 4, an infrastructure 401 is provided, which includes a driver cab 403 for a teleoperated driving operation of a motor vehicle. Driver cab 403 includes a first display 405, a second display 407, and a third display 409. In addition, driver cab 403 includes a steering wheel 411 and multiple pedals, of which only one pedal 413 is shown for the sake of clarity. The pedals image pedals of the motor vehicle to be driven in a remote fashion.

A curved double arrow bearing reference numeral 415 symbolically indicates that motor vehicle 417 is able to be steered in a remote-controlled manner via steering wheel 411.

A person 416 is therefore able to drive a motor vehicle in a remote-controlled manner with the aid of driver cab 403.

A motor vehicle to be remotely controlled is symbolically shown by reference numeral 417 in FIG. 4. Motor vehicle 417 is traveling on a road 419, which has a first traffic lane 421 and a second traffic lane 423. A driving direction for motor vehicles specified by first traffic lane 421 is from right to left in relation to the paper plane. A driving direction for motor vehicles specified by second traffic lane 423 is from left to right in relation to the paper plane. Motor vehicle 417 travels in second traffic lane 423 and thus from left to right in relation to the paper plane.

A dangerous situation, which is symbolically represented by a corresponding traffic sign 425, is located in front of motor vehicle 417 in the driving direction. This dangerous situation, for example, may include an accident, a construction site, or damage to second traffic lane 423.

In addition, a wireless communications network 427 is provided, which includes a WLAN communications network and/or a mobile communications network, for instance.

Infrastructure 401 and motor vehicle 417 communicate with each other via this wireless communications network 427. In other words, driver cab 403 transmits to motor vehicle 417 remote-control instructions, i.e., control instructions for an at least partially automated control of a lateral and/or longitudinal guidance of motor vehicle 417. Conversely, motor vehicle 417 is able to transmit environment data, for example, which describe an environment of motor vehicle 417, to infrastructure 401, i.e., to driver cab 403, the environment corresponding to the environment data being shown on displays 405, 407, 409.

Motor vehicle 417, for instance, includes one or more environment sensor(s), which acquire an environment of motor vehicle 417 and supply environment data corresponding to the acquisition. These environment sensors are not shown for reasons of clarity.

An environment sensor in the sense of the description is one of the following environment sensors, for example: a radar sensor, lidar sensor, video sensor, in particular a video sensor of a video camera, especially a 3D video camera, an ultrasonic sensor, infrared sensor and a magnetic field sensor.

For example, driver cab 403 is able to be operated by the police in order to guide motor vehicle 417 around dangerous situation 421 in a remote-controlled manner.

Motor vehicle 417, for instance, is controlled or guided around dangerous situation 425 along a bypass route 429. This route 429 is specified by a first route point 431, a second route point 433, a third route point 435, a fourth route point 437, and a fifth route point 439, for example.

Route 429 leads around dangerous situation 425 and thus guides motor vehicle 417 to a hard shoulder 441 of road 419, hard shoulder 441 extending to the right of second traffic lane 423, i.e., next to it, right relating to the driving direction of motor vehicle 417. After passing dangerous situation 425, motor vehicle 417 is guided back to second traffic lane 423.

Driver cab 403 may also be referred to as a motor vehicle control center or vehicle control center (VCC).

The communication link via which motor vehicle 417 transmits data, especially environment data, to driver cab 403 may be called an uplink. The communication link via which driver cab 403 transmits data, e.g., remote-control instructions for controlling a lateral and/or longitudinal guidance of motor vehicle 417, to motor vehicle 417 may be referred to as a downlink.

Within the framework of teleoperated driving, motor vehicle 417 transmits sensor information, i.e., especially the environment data such as camera data and/or radar data and/or lidar data, to VCC 403 in the uplink. In VCC 403, with the aid of the three displays 405, 407, 409, this information is displayed to an operator, person 416, who in situations in which a motor vehicle 417 driving in a highly automated or fully automated manner would no longer be able to continue its travel, is thereby able to carry out a control of motor vehicle 417 using control instructions transmitted to motor vehicle 417 in the downlink. For example, the police may guide motor vehicle 417 via breakdown lane 441 past dangerous situation 425.

The corresponding transmission via downlink and uplink features quite different requirement vectors. In the uplink, for example, high data rates and short latency times are required and individual bit errors are tolerable because a camera image, for example, may supply useful information due to the data encoding.

In the downlink, the required data rate is low in comparison with the uplink, but the latency requirement is high and bit errors are unable to be tolerated. Because of the concept described here, it is now possible to ascertain radio channels corresponding to these requirement vectors by way of which a communication link between motor vehicle 417 and VCC 403 is established. For example, the RTP may be used as the transport protocol via a mobile communication in the uplink, and the TCP, for instance, may be used as the transport protocol in the mobile communication in the downlink. When reaching a parking building that provides an excellent WLAN connection, for example, it may be provided to switch from a mobile communication to WLAN because of the better availability that is provided there, for instance.

Figure 5:
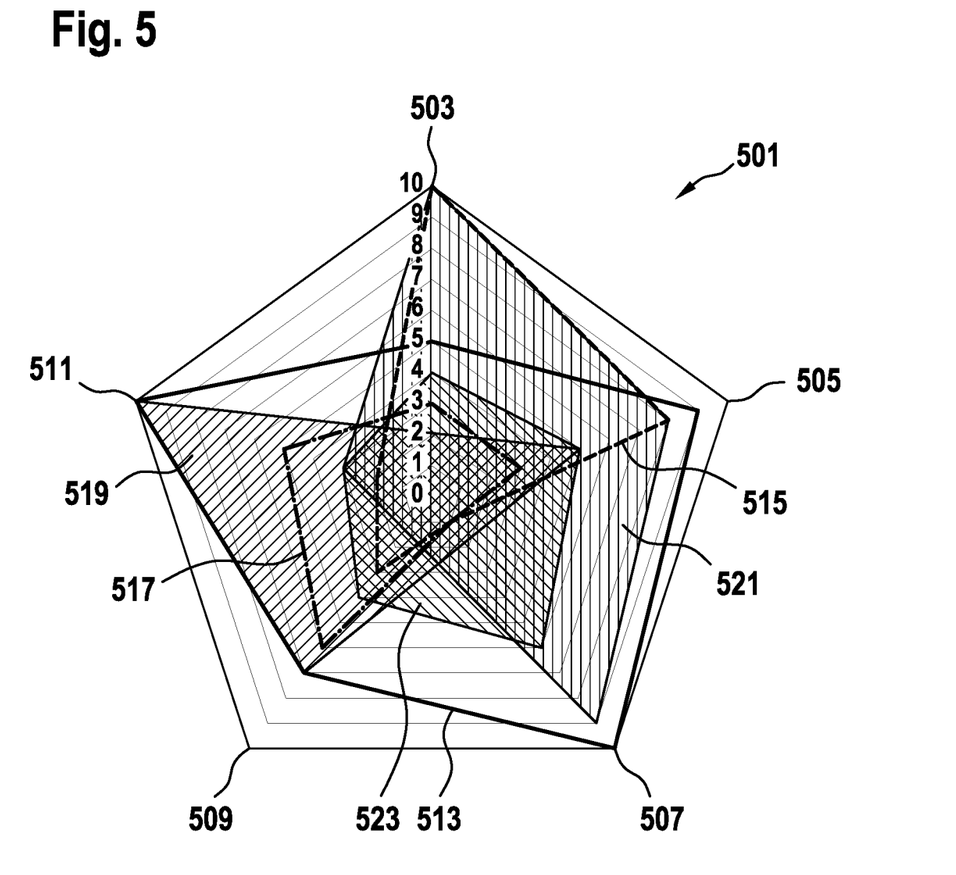
FIG. 5 shows a spider web diagram.

FIG. 5 shows a spider web diagram 501, which may also be referred to as a web diagram.

In spider web diagram 501, different communications performance features are provided as axes of spider web diagram 501: latency 503, availability 505, functional safety 507, data security 509, and data rate 511. In addition, three circled, empty areas of a plurality of requirement vectors are sketched.

Reference numeral 513, for instance, points to a first requirement vector. Reference numeral 515 points to a second requirement vector. Reference numeral 517 points to a third requirement vector.

Moreover, completed areas for different communication possibilities or communication setups are sketched by way of example, which satisfy the different communication performance features to a greater or lesser extent, such as latency 503, availability 505, functional safety 507, data security 509, and data rate 511.

Reference numeral 519 denotes a first communication possibility or a first communication type. Reference numeral 521 denotes a second communication possibility or a second communication type. Reference numeral 523 denotes a third communication possibility or a third communication type.

These three communication possibilities 519, 521, 523 are shown by different hatchings and overlap one another.

The corresponding overlap area between the requirement vector and communication possibility identifies how well the requirement vector is covered by the communication setup or the communication possibility.

In summary, the described concept, for instance, provides to first determine the requirement vectors for one, multiple or all functions to be realized and also for all of their variants. To this end, all relevant individual requirements (e.g., latency, data rate, demand on the functional safety, data security demands) and their validity range (e.g., minimum value, maximum value, standard deviation, compliance probability), for instance, are specified and/or dynamically adapted. In addition, all possible developments of the communication channels and their variants, for instance, will be ascertained (such as which basic communication possibilities are to be considered, e.g., a mobile communication, WLAN; what variants of these communication possibilities there are, e.g., different frequency ranges, different modulation types). At the runtime of the function, according to the afore-described methods (e.g., measurement, time interval, function specification), the most appropriate communications method is then allocated to the requirement vector present just then and selected as the communication channel. For instance, a simple selection may be realized based on fixedly specified allocations between requirements and communication variants. The use of an artificial intelligence can be provided to this end, for instance. Weighting functions, for example, may be used for this purpose for the individual dimensions or parameters of the requirements vectors (in a video transmission, for example, a certain latency as a requirement parameter featuring a high weighting may be regarded as more important than a certain transmission quality, which would then have a lower weighting). In this context, it is provided, for instance, to establish multiple communication channels in parallel if a single channel is unsuitable to satisfy all function requirements (e.g., there may be multiple requirement vectors for different function parts. In the uplink, for example, a different requirement vector may exist for the transmission of sensor data than for a remote control of a vehicle in the downlink). If mapping is to take place for a set of functions, then this may be realized according to different strategies:

1. The requirement vectors of all functions are combined, and the communication channels are then selected accordingly.
2. The communication channel is selected based on the most important function (weighting of the functions). Next, further functions are added if the requirements of the most important function remain satisfied nevertheless. If this is not the case, they must be shifted to further communication channels.

What is claimed is:

1. A method for communicating between a motor vehicle and an infrastructure, the method comprising the following steps:
    ascertaining at least one requirement vector for at least one function to be carried out using the motor vehicle and/or the infrastructure, the at least one requirement vector indicating which characteristics of a communication link between the motor vehicle and the infrastructure should simultaneously be satisfied for an execution of the function;
    ascertaining a communication state, which indicates which communication possibilities exist for a communication link between the motor vehicle and the infrastructure;
    ascertaining at least one radio channel between the motor vehicle and the infrastructure based on the at least one requirement vector and based on the ascertained communication state; and
    establishing at least one communication link between the motor vehicle and the infrastructure using the at least one ascertained radio channel to carry out the at least one function using the at least one established communication link,
    wherein multiple respective requirement vectors are ascertained for multiple functions, the multiple functions being prioritized, and a first radio channel is ascertained for a function of the multiple functions having a highest priority in order to establish a first communication link between the motor vehicle and the infrastructure, and it is checked whether the first radio channel may also be used for at least some of remaining ones of the multiple functions without at least some of the characteristics of the requirement vector corresponding to the function having the highest priority, which are satisfied in the first communication link, no longer being satisfied, and if so, the first radio channel is used for the at least some of the remaining ones of the multiple functions to carry out the at least some of the remaining ones of the multiple functions using the first communication link, and if not, at least one second radio channel is ascertained based on the respective requirement vector of the at least some of the remaining ones of the multiple functions, and at least one second communication link is established between the motor vehicle and the infrastructure based on the at least one second radio channel in order to carry out the at least some of the remaining ones of the multiple functions using the at least one second established communication link.

2. The method as recited in claim 1, wherein the characteristics of the at least one requirement vector are weighted, and the at least one radio channel is ascertained based on the weighted characteristics.

3. The method as recited in claim 1, wherein the at least one radio channel is ascertained based on a table which indicates a fixed allocation between communication possibilities and requirement vectors.

4. The method as recited in claim 1, wherein to ascertain the at least one radio channel, the ascertained at least one requirement vector and the ascertained communication state are transmitted to an input layer of an artificial neural network, and the artificial neural network ascertains a communication channel based on the at least one requirement vector and based on the ascertained communication state, and outputs it at an output layer of the artificial neural network.

5. The method as recited in claim 1, wherein the ascertaining of at least one radio channel includes an ascertainment of a transport protocol for transporting data to be communicated via the at least one communication link, the transport protocol including a TCP or RTP or UDP transport protocol.

6. The method as recited in claim 1, wherein the at least one function is an element selected from the following group of functions:
    transmitting environment data that describe an environment of the motor vehicle from the motor vehicle to the infrastructure and/or from the infrastructure to the motor vehicle; and/or
    transmitting at least one control instruction for an at least partially automated control of a lateral and/or longitudinal guidance of the motor vehicle from the infrastructure to the motor vehicle; and/or
    transmitting data purely for information purposes from the motor vehicle to the infrastructure and/or from the infrastructure to the motor vehicle; and/or
    transmitting data that are required for a safety-critical function from the motor vehicle to the infrastructure, and/or from the infrastructure to the motor vehicle.

7. The method as recited in claim 1, wherein the at least one function encompasses a transmission of environment data describing an environment of the motor vehicle from the motor vehicle to the infrastructure, and/or from the infrastructure to the motor vehicle, the characteristics of the ascertained requirement vector including a minimum data rate and a maximum latency time; the ascertained radio channel being a mobile radio channel or a WLAN radio channel, and RTP being used as a transport protocol for the transmission of the environment data to transmit the environment data from the motor vehicle to the infrastructure, and/or from the infrastructure to the motor vehicle.

8. The method as recited in claim 1, wherein the at least one function includes a transmission of at least one control instruction for an at least partially automated control of a lateral and/or longitudinal guidance of the motor vehicle from the infrastructure to the motor vehicle, the characteristics of the ascertained requirement vector including a maximum latency time and a maximum number of tolerable bit errors, and the ascertained radio channel being a mobile radio channel or a WLAN radio channel, and a TCP being used as a transport protocol for the transmission of the at least one control instruction to transmit the at least one control instruction from the infrastructure to the motor vehicle.

9. The method as recited in claim 1, wherein a motor vehicle state is ascertained, which indicates a current state of the motor vehicle, and the at least one requirement vector is ascertained based on the ascertained motor vehicle state.

10. The method as recited in claim 9, wherein the motor vehicle state is described by at least one of the following state parameters: a velocity of the motor vehicle, and/or a position of the motor vehicle, and/or time of day, and/or date, and/or weather, and/or traffic condition, and/or traffic density, and/or traffic volume.

11. The method as recited in claim 1, wherein the characteristics of the at least one requirement vector is an element selected from the following group of characteristics in each case: a maximum latency time, and/or a maximum number of tolerable bit errors, and/or a minimum data rate, and/or minimum functional safety, and/or minimum availability, and/or a minimum reliability.

12. The method as recited in claim 1, wherein at least some of the characteristics of the at least one requirement vector lie within a predefined value window in each case, the value window being specified by a minimum value and/or a maximum value and/or a standard deviation.

13. The method as recited in claim 1, wherein multiple communication links are established, and one or more of the established communication links is/are selected based on the requirement vector in order to transmit data between the infrastructure and the motor vehicle via the one or the multiple selected communication links.

14. A device configured to communicate between a motor vehicle and an infrastructure, the device configured to:
ascertain at least one requirement vector for at least one function to be carried out using the motor vehicle and/or the infrastructure, the at least one requirement vector indicating which characteristics of a communication link between the motor vehicle and the infrastructure should simultaneously be satisfied for an execution of the function;
ascertain a communication state, which indicates which communication possibilities exist for a communication link between the motor vehicle and the infrastructure;
ascertain at least one radio channel between the motor vehicle and the infrastructure based on the at least one requirement vector and based on the ascertained communication state; and
establish at least one communication link between the motor vehicle and the infrastructure using the at least one ascertained radio channel to carry out the at least one function using the at least one established communication link,
wherein multiple respective requirement vectors are ascertained for multiple functions, the multiple functions being prioritized, and a first radio channel is ascertained for a function of the multiple functions having a highest priority in order to establish a first communication link between the motor vehicle and the infrastructure, and it is checked whether the first radio channel may also be used for at least some of remaining ones of the multiple functions without at least some of the characteristics of the requirement vector corresponding to the function having the highest priority, which are satisfied in the first communication link, no longer being satisfied, and if so, the first radio channel is used for the at least some of the remaining ones of the multiple functions to carry out the at least some of the remaining ones of the multiple functions using the first communication link, and if not, at least one second radio channel is ascertained based on the respective requirement vector of the at least some of the remaining ones of the multiple functions, and at least one second communication link is established between the motor vehicle and the infrastructure based on the at least one second radio channel in order to carry out the at least some of the remaining ones of the multiple functions using the at least one second established communication link.

15. A non-transitory machine-readable memory medium on which is stored a computer program for communicating between a motor vehicle and an infrastructure, the computer program, when executed by a computer, causing the computer to perform the following steps:
ascertaining at least one requirement vector for at least one function to be carried out using the motor vehicle and/or the infrastructure, the at least one requirement vector indicating which characteristics of a communication link between the motor vehicle and the infrastructure should simultaneously be satisfied for an execution of the function;
ascertaining a communication state, which indicates which communication possibilities exist for a communication link between the motor vehicle and the infrastructure;
ascertaining at least one radio channel between the motor vehicle and the infrastructure based on the at least one requirement vector and based on the ascertained communication state; and
establishing at least one communication link between the motor vehicle and the infrastructure using the at least one ascertained radio channel to carry out the at least one function using the at least one established communication link,
wherein multiple respective requirement vectors are ascertained for multiple functions, the multiple functions being prioritized, and a first radio channel is ascertained for a function of the multiple functions having a highest priority in order to establish a first communication link between the motor vehicle and the infrastructure, and it is checked whether the first radio channel may also be used for at least some of remaining ones of the multiple functions without at least some of the characteristics of the requirement vector corresponding to the function having the highest priority, which are satisfied in the first communication link, no longer being satisfied, and if so, the first radio channel is used for the at least some of the remaining ones of the multiple functions to carry out the at least some of the remaining ones of the multiple functions using the first communication link, and if not, at least one second radio channel is ascertained based on the respective requirement vector of the at least some of the remaining ones of the multiple functions, and at least one second communication link is established between the motor vehicle and the infrastructure based on the at least one second radio channel in order to carry out the at least some of the remaining ones of the multiple functions using the at least one second established communication link.

\* \* \* \* \*